United States Patent Office 3,547,652
Patented Dec. 15, 1970

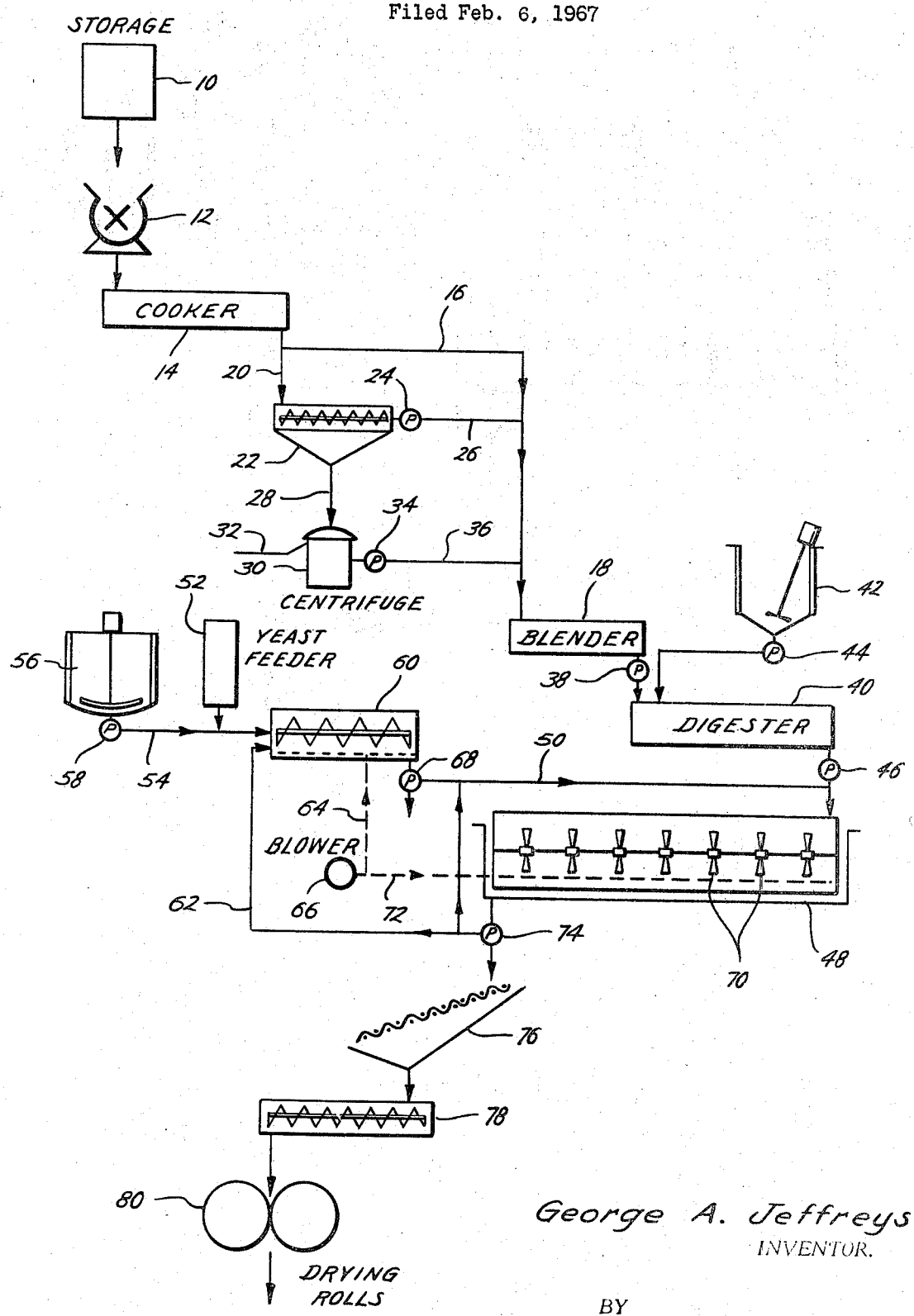

3,547,652
FPC PROCESS
George A. Jeffreys, Salem, Va., assignor, by mesne assignments, to Floyd Gee, Houston, Tex., trustee
Filed Feb. 6, 1967, Ser. No. 614,335
Int. Cl. A23j 1/04
U.S. Cl. 99—18        8 Claims

ABSTRACT OF THE DISCLOSURE

Speeding up the yeast fermentation of proteolytically liquified cooked fish meat, by adding to the fish meat a yeast which has started fermenting in the presence of the reaction product of previously liquified fish and yeast.

---

This invention relates to a new and economical method of producing from fish a concentrated protein powder or meal which is substantially free of fish odor and taste.

For several years a number of organizations have been engaged in research and development of an inexpensive stable wholesome product of high nutritive quality, hygienically prepared from fish, in which the protein and other nutritive materials are more concentrated than they were in the original raw material. Among these organizations is the United States Department of the Interior working through its Bureau of Commercial Fisheries. Information concerning the work done by this Bureau and other organizations may be found in the bulletin entitled "Fish Protein Concentrate" which records hearings before the Committee on Commerce of the United States Senate on Apr. 25, 1966 and May 16 and 17, 1966. A prior hearing is reported in a bulletin of the same name which records hearings before the Subcommittee on Merchant Marine and Fisheries of the Committee on Commerce, United States Senate, which hearings were held on Aug. 14, 1964.

As reported in those bulletins, most of the work done has been directed toward the development of a so-called solvent extraction process for the separation of high protein solids from fish oil and other by-products. However, some work has been done upon the preparation of a desirable product by enzymatic action. For example, such a process is disclosed in United States Patent No. 3,170,794.

The process of the present invention is directed toward an improved enzymatic process for the preparation of a high protein value concentrate which may be used as dietary supplements for humans as well as animals. In addition to providing a high protein concentration, the product of the present invention will contain unidentified growth factors which will be extremely beneficial.

Accordingly, one object of this invention is to provide a fish protein concentrate which is substantially free of all fish odor and taste.

Another object of the invention is to provide a process for the preparation of a fish protein concentrate having a high food value by the employment of enzymes as fish modifying agents.

Still another object is to provide a method of enzyme activation for converting fish to desirable food proteins while inhibiting the growth of harmful bacteria.

In a preferred embodiment of the invention, the foregoing and other objects of the invention may be accomplished by digesting cooked fish by means of a proteolytic enzyme until the fish solids have become liquefied, and then reacting the liquefied fish with yeast. This material is dried and the solid fish protein concentrate recovered.

When the process of this invention is used, substantially any type of fish material can be used as the source of the protein. For human consumption, fish with a low fat content is preferable, however, in one embodiment of the invention, fish with a high fat content may be used and still produce a good palatable product. When such fish containing a high percentage of oil are used in the process, the excess oil can be extracted by any standard solvent extraction method. In the preparation of animal feed supplements, fish suitable for use may include trash fish, whole fish, or the waste products from canneries and food plants.

An understanding of the invention may be facilitated by reference to the single figure of the accompanying drawing, which shows a flow diagram of a plant suitable for the practice of the present invention.

It will be understood that the equipment shown in the flow diagram is shown only schematically, and that such equipment is well known in the art and is available from many equipment suppliers as, for example, Edward Renneburg & Sons, Co. of Baltimore, Md. It is not contemplated that any equipment will be needed which is not either commercially available or readily fabricated by those skilled in the art and, therefore, no detailed description of such equipment is believed to be necessary or desirable.

As shown in the embodiment of the process set forth in the flow diagram, raw fish may be brought from a storage vessel 10, which preferably is refrigerated if the fish is to be held for any extended period of time, through a comminuter 12 in which the fish is cut up into small pieces. The comminuter may comprise a hammer mill or some other shredding device suitable for reducing the fish to small pieces which are readily cooked and digested. From the comminuter the fish is discharged into a cooking vessel 14, which preferably is elongated and has conveying means therein, such as a screw conveyor, so that the fish pieces may be moved through the cooking vessel while they are being cooked. The cooking may be performed at temperatures of 100° C. or even higher, and a preferred method is by direct heating with live steam. Preferably the fish is agitated slowly while cooking. A cooking time of about 10 minutes is usually sufficient at 90° C. to 100° C. In addition to making the fish easier to digest by the enzymes, the cooking destroys many undesirable bacteria.

If fish with a low fat content is being processed, it may be passed from the cooker through line 16 directly into a cooling blender 18. However, if high fat content fish is used, it may be desirable at this point to extract the major proportion of the oil. This is accomplished, in the embodiment shown, by transferring the fish through conduit 20 into a filter press 22, which may include a screw conveyor to remove the filter cake. Such screw presses are well known in the art and need not be described in detail herein. The wet filter cake may be taken off by means of a pump 24 or a transfer conveyor through a line 26 leading to line 16 and the filtrate may be transferred through the line 28 to a conventional centrifuge 30. The centrifuge separates most of the oil, which is taken off through a line 32, and the stick water which is transferred to line 16 by means of a pump 34 and a pipe 36. From this point the wet cake and the stick water, now substantially free of oil, are passed together to the cooling blender 18.

The cooling blender has means therein for conveying the cooked fish longitudinally of the blender, as, for example, a screw conveyor, and also has refrigeration means for reducing the temperature of the cooked fish to a temperature suitable for digestion by the enzymes. Upon being removed from the cooling blender by means of a pump 38, the cooked fish is transferred to a digester 40. At this point the desired enzymes are transferred from a container 42 by means of a pump 44 into the digester 40. In the digester the cooked fish and the enzymes are mixed together and move from the left end, as shown in the drawing, to the right end of the digester, as by means of a screw conveyor or the like, for a period sufficient to substantially complete the digestion of the fish solids to liquid form. Alternatively, several digester tanks may be used alternately. For example, one tank may be filling while a second is on the digestion cycle and a third is being emptied.

The liquefied fish is then transferred by means of a pump 46 into a reactor 48. At this point the liquefied fish is combined with activated yeast which is fed in through a line 50.

Yeast may be provided from a dry yeast feeder 52 which feeds the yeast into a line 54 leading from a concentrated wort storage container 56. A pump 58 may be used to transfer the concentrated wort together with the dry yeast into a yeast reactivator 60. In this device a conveyor such as a screw conveyor is used to slowly move the growing yeast from the left end to the right end of the reactivator as shown in the drawing. At the same time an extract from the outlet of the reactor 48 is fed into the left end of the yeast reactivator by means of a line 62, and the composition in the reactivator is continuously aerated by means of air supplied through a pipe 64 from an air source 66. The activated yeast is removed from the right end of the reactivator by pump 68, which transfers the yeast at a desired rate through the conduit 50 into the right end of the reactor 48 where it is mixed with the liquefied fish.

In the reactor 48 the liquefied fish and yeast mixture is stirred by blades 70 and is aerated by air provided through a line 72 while slowly being moved from the right end of the reactor, as shown in the drawing, to the left end, where it is extracted by means of a pump 74, with a small portion being fed back through the line 62 to the yeast reactivator, as previously described. However, the major portion of the reacted material is passed through a screen 76 which serves to remove any undigested bones and other solid materials. The liquid is then fed through a homogenizer 78, and from this to a dryer 80, where the material is dried until most of the liquid has been removed.

From this point the product may be used as is or it may be further dried or solvent extracted to remove any remaining oils. It may then be ground to a suitable powder or granular form as desired.

It will be appreciated that in order to economically utilize a continuous process, it will be highly desirable to speed up the various reactions as much as possible without sacrificing the desirable effects sought. It is, therefore, highly desirable that an enzyme be used which is capable of a high liquefication rate.

It is appreciated that the enzyme used for digestion must be proteolytic, that is, one which is capable of hydrolyzing proteins. Enzymes such as those described in the aforesaid U.S. Patent No. 3,170,794 are reasonably effective for this purpose. For example, such enzymes include those produced by the *Oryzaeflavus* group of molds of the genus Aspergillus. Other enzymes which are preferred for the process of this invention are the proteolytic enzymes from bacterial sources, such as *Bacillus subtilis*, proteolytic enzymes from vegetable sources such as papain, bromelin, ficin, etc., other fungal proteolytic enzymes such as *Aspergillus niger*, and enzymes from animal sources such as pancreatin and trypsin.

The temperature used in the digester will vary depending upon the particular enzyme used and the concentration of that particular enzyme. Also, higher temperatures usually speed up the digestion process. Preferably temperatures no higher than about 60° C. should be used with a bacterial enzyme although they can be used at temperatures up to about 90° C. Pancreatin cannot be used at temperatures above 60° C. and preferably is used at temperatures below about 52° to 53° C. Other enzymes are reasonably active at temperatures as low as about 30° C. The lower temperature limit is governed by the desire for a high reaction rate and by the fact that it must not be so low as to allow excessive growth of undesirable bacteria.

Upon the addition of the enzyme to the fish slurry in the digester, the pH in the digester is adjusted to improve the liquefication activity. Each enzyme has its optimum pH for best results, and pH of the fish must therefore be adjusted accordingly. Bacterial and pancreatin enzymes work best at 6.5 to 7 pH while fungal enzymes are most efficient at 5.5 and vegetable enzymes may be used at pHs from 5 to 7. The enzymes are used in such concentrations as will modify the fish to a creamy liquid state in a short time without breaking it down completely to amino acids. For a continuous process, economics dictate a liquefaction period preferably no greater than about 30 minutes.

Various combinations of enzymes have been used and found to satisfactorily liquefy cooked fish in a relatively short time. The amount of a particular enzyme to use may be readily determined, and may be adjusted as desired to fit varying conditions. The following table shows the time required for liquefaction with various enzymes. The pH and the temperature of the slurry are shown, as well as the amount of enzyme per pound of cooked fish:

| Enzyme | pH | Temperature, ° C. | Amount, mg. | Time, min. |
|---|---|---|---|---|
| 1. Pancreatin 3X | 6.5 | 45 | 135 | 25 |
| 2. Trypsin | 6.8 | 45 | 90 | 20 |
| 3. Subtilis—5,000 PC units | 7.0 | 50 | ¹ 1.35 | 20 |
| 4. Papain | 6.5 | 45 | 112½ | 22 |
| 5. Bromelain | 6.0 | 45 | 135 | 18 |
| 6. Ficin (concentrated) | 6.5 | 45 | 22 | 15 |
| 7. Fungal—4,000 H.U. | 5.6 | 42 | ¹ 9 | 25 |
| 8. Fungal—4,000 H.U. | 6.0 | 45 | ¹ 2¼ | 14 |
| Plus bromelain | | | 45 | |

¹ Grams.

It will be seen that when any of the above enzymes are used under the conditions shown, liquefaction may be obtained in less than 30 minutes. Thus, a digester may be designed to retain the mixture of fish and enzyme for 30 minutes before it moves out the end of the digester into the reactor 48. Alternatively, the digester may discharge into the reactor in batches, or two or more digesters may be used with one of them discharging into the reactor while the digestion step is taking place in the other.

In the reactor 48, the liquefied fish is fed into one end and the product is fed out the other end. In the typical continuous process, a load from the digester would be fed into the reactor every 20 to 30 minutes and the material will stay in the reactor from 1 to 3 hours. The reactor may therefore have several digester loads in it at the same time. Suitable baffling may be used to cause the material to move laterally along the reactor as additional material is fed in at one end and the completely reacted material is taken out at the other end. Alternatively, three or more reactors may be used in sequence.

As previously stated, a portion of the product of the reactor is fed back through line 62 to the yeast reactivator 60.

In the preparation of the yeast for the yeast reactivator, it is combined with concentrated wort or nutrient from the container 56. The wort is a liquid nutrient for the yeast whose principal ingredients are sugar or dextrose plus nutrient salts and nitrogen. Malt phosphates and other well known nutrients for yeast may also be included in the wort. Preferably, it is in concentrated form so as to provide a relatively large amount of nutrient in a condition that does not spoil readily, which can be diluted upon feeding into the yeast reactivator 60. Thus, if the wort contains 30 percent average sugar, it can be diluted by the addition of ten parts of water to make a diluted nutrient in the yeast reactivator containing about 3 percent sugar. Preferably the yeast is activated in a wort solution containing no more than about 5 percent sugar.

Either a yeast emulsion or a dry yeast may be combined with the wort upon feeding into the yeast reactivator. The preferred yeasts to use are the usual bakers, brewers and distillers yeasts. It is anticipated, however, that other yeasts having similar activity may also be used with good results.

Advantageous results are obtained by the addition to either the yeast reactivator or the reactor, of whey, which is a standard commodity, being a by-product in the manufacture of cheese. It is composed principally of lactose or milk sugar and a small amount of protein, usually about 12 to 13 percent. It also contains several unidentified growth factors, and further, it has the ability to mask fish odors and to improve the flavor of the fish protein concentrate. Alternatively or in addition to whey, corn steep liquor, which is a by-product from the manufacture of starch and dextrose, may be used for the same purposes. This material also would be of some value in the wort to accelerate yeast fermentation. The amount of whey and corn steep liquor used may be varied to suit particular requirements. A typical operation may use 5% to 15% of these materials in the concentrated wort.

As has previously been stated, a small amount of the product from the reactor is recycled or fed back into the yeast reactivator. This speeds up the activation of the yeast and reduces the amount of yeast required. In addition, some of the organic material from the fish is thereby fed into the yeast reactivator, and the yeast is therefore pretrained to work on the fish. Thus, fermentation of the yeast is begun before it is fed into the reactor, and it is obtained under conditions highly conducive to fast reproduction of the yeast cells. Such conditions include an abundant supply of air or oxygen and a rather low concentration of nutrients, preferably not in excess of about 5 percent. By this process, the production of metabolites which inhibit spoilage, that is, which decrease the activity of putrefaction bacteria, is greatly increased. At the same time, the activity of beneficial bacteria, such as lactics, is increased.

When it is necessary to shut down the plant for any reason, the feed back material can be held in the line running to the yeast reactivator or in a separate container, preferably at a temperature of 50 degrees F. or lower, and can be used when the plant starts up again to regenerate the yeast feed. Thus, the feed back method permits a start up of the plant without any delay while waiting for the yeast to be activated. This feed back method reduces the total time required for the yeast reaction to about one-third to one-fourth the time which would be required if the dry yeast were fed directly into the reactor.

In one embodiment of the invention a small amount of a mold enzyme, such as *Aspergillus oryzae,* may be used in the reactor together with the yeast in order to stimulate the yeast in its action against undesirable bacteria. In addition, the mold enzyme reacts with flavor and odor causing components so as to help reduce the fish odor and flavor. The mold enzyme may be introduced separately, or together with the other enzymes, at the rate of about 1 gram per pound of cooked fish.

Preferably, the temperature in the yeast reactivator and in the reactor should be held between about 25° C. and about 37° C. in order to insure rapid proliferation of the yeast cells. It will be appreciated that the yeast fermentation continues in the reactor, and that in doing so it consumes some of the flavor and odor producing factors of the fish. In addition, this multiplication of yeast cells improves the nutritional value of the fish protein concentrate.

Because of this continued growth of the yeast in the reactor, it is possible under some conditions to operate without adding any yeast after the first injection of the yeast, since some portion of the yeast is fed back into the yeast reactivator continuously. However, usually it will be found desirable to continuously add yeast, in the amount of from about ¼% to 1% of the weight of fish solids processed. Cooked fish usually contains about 25% of fish solids.

The time of reaction in the reactor is determined chiefly by the flavor desired and the degree of destruction of undesirable bacteria. Usually a time of one to three hours is sufficient to obtain a substantially fish flavor free product. The speed of reaction depends on a number of factors, including the concentration of yeast used, the amount of the feed back, and the temperature and pH of the emulsion in the reactor.

The addition of yeast in the process adds to the nutrient value of the product, helps to neutralize fishy flavors, and keeps down spoilage by acting against putrefaction bacteria. It is desirable to maintain a low pH in the reactor, that is, a pH of no greater than about 5.2, in order to stimulate the activity of the yeast in reducing spoilage. Yeast grows getter at the low pH and is therefore particularly desirable for reduction of spoilage under conditions which are not substantially sterile.

Following the reaction in the reactor, the liquid product may be screened and then delivered to the dryers and dried to a desired moisture content. It may in some instances be desirable to dry it to about a 6 percent moisture content. This would be particularly desirable if, because of the use of an oily fish, it is necessary to extract the oil with isopropyl alcohol or the like. Following the drying, and extraction if used, the product is ground to a flour or meal, as desired.

The following specific examples illustrate the practice of the process:

EXAMPLE 1

In a pilot plant operation for processing low fat containing fish, whole fish are continuously conveyed from a cold storage tank at a rate of two pounds per minute and washed by passing under clean water sprays. The washed fish is discharged into a hammer mill where it is cut into small pieces. The shredded fish is next discharged into a standard continuous direct steam cooker. The fish is continuously cooked with live steam for ten minutes while being conveyed by flights from one end of the cooker to the discharge end. The average cooking temperature is 100° C. After cooking, the fish is continuously discharged into a cooling blender which has cold brine circulating in a jacket around it. In this blender the fish is cooled in less than 10 minutes to 55° C.

From the cooling blender, the fish is continuously discharged into a digestion tank along with a water mixture of enzymes. The enzymes are continuously pumped into the digester at a rate of 45 grams per minute and at a temperature of 10° C., which at this temperature helps to cool the fish down to 45° C. The enzyme mixture consists of pancreatin 3× and a fungal culture of *Aspergillus oryzae* on bran.

The concentration of the enzymes is such that a 5 percent addition of the enzyme slurry to the cooked fish, or approximately 45 grams per minute, adds 100 milligrams of pancreatin and 1 gram of fungal culture per pound of fish. The pH of the enzyme mixture is adjusted to 6.5 by the addition of citric acid, and the final fish mixture in the digester has a pH of 6.4. Other food acids, such as acetic acid or phosphoric acid, might be used to adjust the pH.

The mixture in the digester is moderately agitated while being conveyed through it. The mixture stays in the digester for 20 minutes, at the end of which time it has been liquefied to a consistency of heavy cream. The liquefied fish is then discharged by means of a proportioning pump into a continuous reactor. The reactor is of such size that it will hold 240 pounds of fish for two hours.

The capacity of the pump at the discharge end is so regulated that it pumps out two pounds of fish per minute.

As the liquid fish is pumped into the reactor, it is corrected to a pH of 5.4 by the addition of citric acid for the purpose of making it more suitable to yeast fermentation and to a fungal enzyme reaction.

A concentrated wort is prepared composed of 30 percent dextrose, 5 per cent molases, 5 percent corn steep liquor, 5 percent dried whey, and 1 percent monocalcium phosphate. The wort is pumped continuously at the rate of 9 mls. per minute and to this is added water at the rate of 81 mls. per minute. One gram of active dry yeast per minute is fed into the yeast reactivator by means of a percentage dry yeast feeder. This provides approximately one-half percent of dry yeast based on the solids of fish processed, or 0.110 percent based on the raw fish. The yeast is maintained in the yeast reactivator approximately one hour at a temperature of 33° C.

The liquefied fish in the reactor is inoculated with the active fermenting yeast from the yeast reactivator by means of a proportioning pump. The fermenting yeast solution is added at the rate of 90 grams per minute.

After two hours in the reactor, the product is discharged, and about 2 percent of the discharged fermented liquid fish is fed back to the yeast reactivator.

Each of the yeast reactivator and the reactor are continuously aerated by means of an air pump.

The main portion of the product from the reactor is now discharged into a homogenizer which pulverizes the fish bones and other particles into a fine state for conditioning it to be dried on a drum dryer. The liquid is then continuously passed to a drum dryer for drying, and is subsequently ground to a powder and is ready for use. The product produced is of light tan color with substantially no flavor or odor of fish.

EXAMPLE 2

In this example, an oily fish was used and the process used was substantially the same as that in Example 1 with the following exceptions. After cooking, the fish was continuously discharged into a continuous screw press in which water and oil in emulsion form is continuously pressed out into a holding tank while the pressed cake discharges into the coolIng blender. The water-oil emulsion is fed continuously into a centrifuge which separates most of the oil from the water. The oil is pumped into a storage tank and the stick water is pumped to the cooling blender where it is recombined with the pressed fish cake. The cooling blender then cools the mixture to a temperature of approximately 55° C.

The cooked fish mixture is then passed through the same process as described in Example 1 until the liquid homogenized fish is dried on drum dryers. The drum dried fish is then comminuted through a number 20 screen. An analysis reveals that the remaining oil in the dried fish is 4.6 percent. The granulated dried fish is then continuously extracted with isopropyl alcohol in a conventional counter current extraction system. Upon discharging from the extractor, the solvent is recovered in a vacuum oven dryer. The fish protein concentrates obtained from this operation contains less than 0.2 percent fat and is of light tan color and free of fishy taste or odor.

The process of this invention as illustrated by specific examples and as described in various forms herein results in the production of extremely high quality fish protein concentrate in a continuous operation which is far more economical than any system heretofore devised. Because of the preactivation of the yeast, the yeast fermentation in contact with the fish is greatly speeded up so that a much smaller reactor can be used. The separation of the reaction of the yeast from the liquefaction operation also allows each of these operations to be speeded up and also improves the flavor masking, the destruction of putrefaction bacteria, and the rate of liquefaction.

Although various embodiments of the invention have been described herein and several specific examples have been given, it will be appreciated that changes and modifications thereof may be made without departing from the scope of the invention. Therefore, it is not intended to limit the invention to the specific embodiments of the process shown and described herein, but only in the manner defined by the appended claims.

I claim:
1. In a process for preparing fish protein concentrate wherein cooked fish meat is liquefied by the action of proteolytic enzymes and then reacted with yeast, the improvement which comprises
    beginning fermentation of the yeast before adding it to the liquefied fish by fermenting it in the presence of a small amount of the reaction product of the previously liquefied fish and yeast, said amount being sufficient to speed up the action of the yeast fermentation.
2. A process as defined by claim 1 wherein the preliminary fermentation takes place in the presence of oxygen and not in excess of about 5 percent nutrients for the yeast.
3. A process as defined by claim 2 and including adding whey or corn steep liquor to the yeast being fermented.
4. A process as defined by claim 1 wherein a mold enzyme is added to the yeast being fermented.
5. A process for preparing fish protein concentrate which comprises
    cooking fish meat,
    liquefying the cooked fish meat by the action of proteolytic enzymes in a digester,
    continuously transferring the mixture of liquefied fish meat and enzymes into a reactor together with fermenting yeast from the outlet of a yeast reactivator,
    continuously moving the resulting mixture through the reactor from the point of enry to an outlet therefrom while the yeast continues fermenting, the velocity therethrough being such that the reaction time is no more than about three hours,
    continuously extracting, from a point near said outlet, a small amount of said resulting mixture and feeding it into an inlet to said yeast reactivator,
    continuously feeding wort to said yeast reactivator near the said inlet,
    moving the growing yeast in the yeast reactivator from said inlet to said outlet therein,
    continuously withdrawing from the reactor outlet the remainder of said resulting mixture,
    and recovering fish protein concentrate therefrom, said amount being sufficient to speed up the action of the yeast fermentation.
6. A process as defined by claim 5 and including injecting oxygen into the fermenting yeast mixture in the yeast reactivator, the nutrients therein being less than about 5 percent.
7. A process as defined by claim 5 and including adding whey or corn steep liquor to the yeast being fermented.
8. A process as defined by claim 5 wherein a mold enzyme is added to the yeast being fermented.

References Cited
UNITED STATES PATENTS
3,170,794   2/1965   Jeffreys et al. _____ 99—18
3,254,000   5/1966   Chibret _____ 195—2

ALVIN E. TANENHOLTZ, Primary Examiner

R. B. ANDEWELT, Assistant Examiner

U.S. Cl. X.R.

99—7, 234; 195—112, 121